US009721569B2

(12) United States Patent
Falik et al.

(10) Patent No.: US 9,721,569 B2
(45) Date of Patent: Aug. 1, 2017

(54) GAUSSIAN MIXTURE MODEL ACCELERATOR WITH DIRECT MEMORY ACCESS ENGINES CORRESPONDING TO INDIVIDUAL DATA STREAMS

(71) Applicant: INTEL CORPORATION, Santa Clara, CA (US)

(72) Inventors: Ohad Falik, Kfar Saba (IL); Michael E Deisher, Hillsboro, OR (US); Ioannis Yannis Schoinas, Portland, OR (US); Jenny Chang, San Ramon, CA (US); Hai Ming Khor, Bukit Mertajam (MY)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 14/722,489

(22) Filed: May 27, 2015

(65) Prior Publication Data
US 2016/0351195 A1    Dec. 1, 2016

(51) Int. Cl.
*G10L 15/00* (2013.01)
*G10L 15/28* (2013.01)
*G10L 15/14* (2006.01)

(52) U.S. Cl.
CPC ............ *G10L 15/285* (2013.01); *G10L 15/14* (2013.01)

(58) Field of Classification Search
None
See application file for complete search history.

(56) References Cited

U.S. PATENT DOCUMENTS

| 7,953,219 | B2* | 5/2011 | Freedman | G06Q 30/02 379/265.06 |
| 2005/0198459 | A1* | 9/2005 | Bogin | G06F 5/06 711/167 |
| 2006/0117119 | A1* | 6/2006 | Emerson | G06F 1/3228 710/22 |
| 2008/0255839 | A1* | 10/2008 | Larri | G10L 15/10 704/238 |
| 2013/0158997 | A1* | 6/2013 | Natarajan | G10L 15/08 704/240 |
| 2014/0188470 | A1 | 7/2014 | Chang et al. | |
| 2014/0344194 | A1* | 11/2014 | Lee | G06N 99/005 706/12 |
| 2015/0287406 | A1* | 10/2015 | Kristjansson | G10L 21/0232 704/233 |
| 2015/0302854 | A1* | 10/2015 | Clough | G06F 19/3418 704/275 |
| 2016/0093297 | A1* | 3/2016 | Deisher | G10L 15/285 704/236 |

OTHER PUBLICATIONS

Ma, et al., "Novel CI-Backoff Scheme for Real-Time Embedded Speech Recognition", Mississippi State University1, Starkville, Mississippi, Intel Corporation, Hillsboro, Oregon, 4 pages.
(Continued)

*Primary Examiner* — Marcus T Riley
(74) *Attorney, Agent, or Firm* — Jordan IP Law LLC

(57) ABSTRACT

Systems, apparatus and methods are described including operations for memory access via direct memory access engines, of a Gaussian Mixture Model Accelerator, corresponding to individual data streams.

20 Claims, 7 Drawing Sheets

(56) References Cited

OTHER PUBLICATIONS

Graves, et al., "Speech Recognition With Deep Recurrent Neural Networks", Department of Computer Science, University of Toronto, 5 pages.
Povey et al., "The Kaldi speech recognition toolkit", retrieved from ResearchGate, Sep. 24, 2015, 5 pages.
Gad, et al., "A new algorithm for learning in piecewise-linear neural networks", Neural Networks 13 (2000) 485-505, 21 pages; received Jun. 27, 1997; revised Mar. 15, 2000; accepted Mar. 15, 2000.

* cited by examiner

GAUSSIAN MIXTURE MODEL ACCELERATOR WITH DIRECT MEMORY ACCESS ENGINES CORRESPONDING TO INDIVIDUAL DATA STREAMS

BACKGROUND

The GMM (Gaussian Mixture Model) Scoring operation often involves heavy computation, which may use large data structures with poor locality of reference. Accordingly, memory organization and packing are typically required to control the memory footprint of the application. When executed on standard compute engines the memory management of the data and the re-use patterns may limit the efficiency of its operation For example, when software (SW) based solutions handle this algorithm (e.g., the GMM (Gaussian Mixture Model) Scoring operation they may rely on the statistical behavior of caches and cache prefetch behaviors to handle the data locality. Due to the high streaming nature of many parts of the application (e.g., 10-100 MB of data being read before being re-used) this can cause thrashing of data caches.

Further, data is typically organized as bytes, words or double words depending on the data type. Multiple scathe/gather instructions are typically required to un-pack the memory and set it for the compute phase. For example, when only part of the outputs are processed using an active list, which may be sparse, data may be badly scattered.

In some implementations of GMM (Gaussian Mixture Model) scoring operation may be applied to automated electronic processing of speech and other acoustic signals. Automated electronic processing of speech and other acoustic signals is challenging due, in part, to the wide variety of pronunciations, accents, and speech characteristics of individual speakers. Constraints such as language models and acoustic models may be used to make decisions about the words the user speaks, but acoustic models are often mathematically intensive.

For example, most large vocabulary continuous speech recognition systems use continuous density hidden Markov models (HMM) for the acoustic modeling of speech. An HMM may include several active states and each active state output may be modeled with a Gaussian Mixture Model (GMM) probability density function. HMMs are typically used to model sub-word units of sound or entire words. In the English language, there are approximately forty phonemes or individual units of sound that can be employed to form more complex utterances. Phonemes may be considered in context, and there are up to 64,000 triphones (i.e., sequences of three phonemes) in the English language.

A model of a phoneme in isolation may be referred to as a context independent (CI) phoneme model. A model of a sequence of phonemes may be referred to as a context dependent (CD) phoneme model. For example, in the word "cat" the /c/ sound may be modeled with a CI phoneme model and the /c/a/ sound may be modeled with a CD phoneme model. GMMs may be used to represent the state output probability density functions of CI phoneme models (i.e., a CI GMM) and CD phoneme models (i.e., CD GMM).

In conventional speech recognition systems, scores for GMMs associated with phonemes and triphones are computed for each frame of an audio signal and stored. This requires significant processing and memory usage. For real-time processing, all GMM parameters (e.g., means, variances, mixture weights) must be continually loaded resulting in a high memory bandwidth requirement. In a portable device, high computation usage and memory bandwidth may lead to a slow response time for an end user as well as a shortened battery life.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
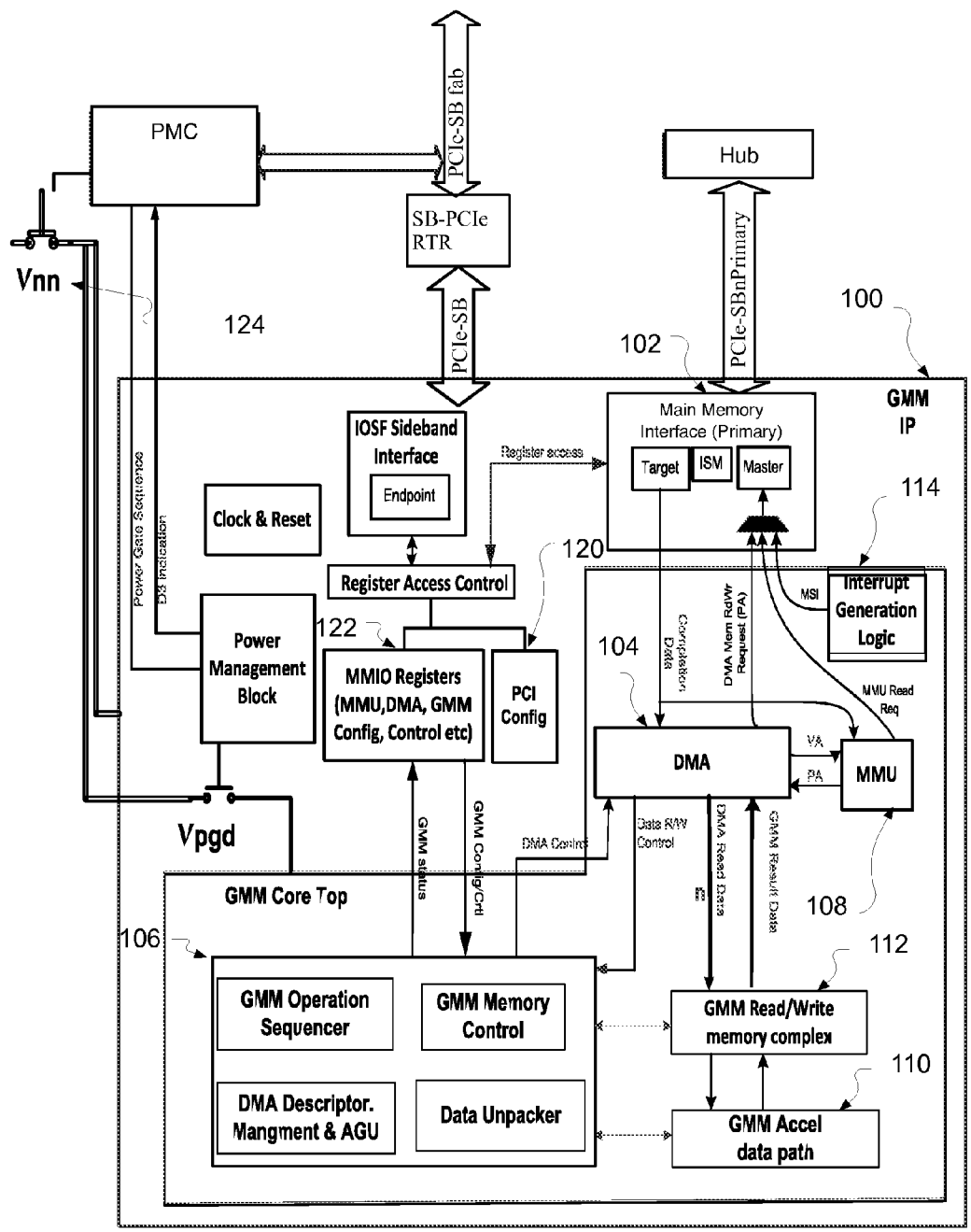
FIG. 1 is an illustrative diagram of an example GMM (Gaussian Mixture Model) system.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein. The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

Systems, apparatus, articles, and methods are described below including operations for memory access via direct memory access engines, of a GMM (Gaussian Mixture Model) Accelerator, corresponding to individual data streams.

As discussed above, the GMM (Gaussian Mixture Model) Scoring operation often involves heavy computation, which may use large data structures with poor locality of reference. Accordingly, memory organization and packing are typically required to control the memory footprint of the application. When executed on standard compute engines the memory management of the data and the re-use patterns may limit the efficiency of its operation.

For example, when software (SW) based solutions handle this algorithm (e.g., the GMM (Gaussian Mixture Model) Scoring operation they may rely on the statistical behavior of caches and cache prefetch behaviors to handle the data locality. Due to the high streaming nature of many parts of the application (e.g., 10-100 MB of data being read before being re-used) this can cause thrashing of data caches.

Further, data is typically organized as bytes, words or double words depending on the data type. Multiple scathe/gather instructions are typically required to un-pack the memory and set it for the compute phase. For example, when the active list indicates the scattered location of data that may need to be processed is sparse, data may be badly scattered. The active list by itself may operate as a pointer/index to scattered locations in memory that may need to be processed As will be discussed in greater detail below, the GMM scoring accelerator (GMMSA) as disclosed herein addresses these memory management issues with proper streaming and buffering schemes.

For example, the GMM scoring accelerator (GMMSA) as disclosed herein may typically include a math processing element and a set of data feeding engines that guarantee efficient data streaming, using minimal buffering on one hand and an efficient multi-stream pipelining on the other. Some portions of the data (e.g., Var, Mean, Const and in some cases active list) may be streamed with a rate set (e.g., a rate set by the data consumption rate). Some portion of the data (referred to herein as a "Feature Vector") may be re-used during the operation, being read at the beginning and then re-used from a buffer within the module. Results may be streamed to memory as they become ready. Prefetch mechanisms may be used to try to guarantee that data is available on time, where such data flow control guarantees may reduce the amount of buffering required with minimal impact on performance. Further, the hardware (HW) GMM scoring accelerator (GMMSA) as disclosed herein may be adapted to be capable of operating at a significantly lower power (~3 mW vs ~300 mW) and cycle count (1 clock/Gaussian vs. 17-65 clocks/Gaussian). One experimental example has resulted in 1 clock up to 48 MAC operations; in such an example to the ability to execute at the maximal rate that the compute engine allows may be dependent on size of the Gaussian or other items such as data re-use patterns.

FIG. 1 is an illustrative diagram of an example GMM (Gaussian Mixture Model) system, arranged in accordance with at least some implementations of the present disclosure. In various implementations, GMM system may be implemented as a GMM Accelerator 100. Such a GMM Accelerator 100 may be a module design to operate as a device in PCIe like environment. FIG. 1 is a block diagram of one such implementation of such a module.

As will be described in greater detail below, GMM Accelerator 100 may include several components, including: individual DMA (Direct Memory Access) engines 104, a GMM execution core 106, an MMU (Memory Management Unit) 108, a GMM data path logic 110, a GMM read/write memory complex 112, an interrupt generation logic 114, the like, and/or combinations thereof. Further, GMM Accelerator 100 may include additional items that have not been shown in FIG. 1 for the sake of clarity. While the GMM Accelerator 100 illustrated here is shown as an integrated product, it will be appreciated that non-integrated implementations might also be utilized in at least some implementations of the present disclosure.

As used herein, the term scoring (e.g., as might be done via execution core 106) may refer to Gaussian Mixture Model (GMM)-type operations, or other operations such as calculating the output of a neural network in the GMM. Accordingly, it will be understood that while many components are described herein as "GMM"-type units, these units may equally be similarly described as being configured for operation on another type of scoring operation, such as Affine Neural Network, Diagonal Matrix multiplication, Recurrent Neural Networks, Copy Operations, the like, and/or combinations thereof.

The PCIe i/f may be the primary control over the module used to configure the model registers. For example, two groups of registers may be used: PCI configuration registers 120 (e.g., in which there may be the ability to power manage the module) and MMIO registers 122 that may be used for all run-time configuration and control. These registers 120 and/or 122 may hold most of the module's state while Idle—which may allow for powering off the other parts of the module when not active.

The module may be built using the main power domain 124 (noted as Vnn), which may always be on when the module is accessible. This domain 124 may include the bus interface sections, registers that hold the configuration and setup for the operation, and logic required to control these. All other logic may be gated off when a scoring operation is not performed, as it may hold no state between activations. It may be in some cases, e.g., for debug purpose, that the other logic will hold state; in which case, the other domain can be kept powered to retain that information and give access to it. Other methods, such as retention flops, may be used as well for that purpose.

During scoring operation GMM Accelerator 100 may be reading from memory 102 one small part of the data known as "feature vector" and stores it for the entire operation (e.g., multiple feature vectors may be read and stored to allow for 'grouping' to be discussed later). All other data may be streamed to the GMM Accelerator 100, used for calculation and discarded. All required streams might be read in parallel based on their rate of consumption. This parallel reading may minimize the amount of buffering required for each stream as its read rate is controlled by the rate the executing unit is consuming it. In case data for one of the streams is late due to unexpected delays in accessing memory the pre-fetch to other streams will be delayed once the proper buffering level is reached.

Data may also be written to memory 102 as soon as a full buffer of results is ready. The organization of the data in memory may be set based on the amount of grouping to allow handling as a single stream of data (e.g., with a single DMA (Direct Memory Access) engine) 104.

Each individual DMA (Direct Memory Access) engine 104 may get the 'current sequence for read/write' (e.g., start address and length) and the next sequence, from which a read/write will be required which may be used close to the end of the sequence/block to enable a data read/write operation ahead of the unit that use the data to performs the calculations. In other words, the DMA may be set up ahead of time to allow the DMA operation to be ahead of the execution unit (e.g., data consumption via GMM execution core 106) so data will be ready on time.

GMM execution core 106 may calculate the address of all read/write streams based on the input parameters. Each individual DMA (Direct Memory Access) engine 104 may be setup with the proper corresponding access stream in the device linear address space.

As used herein, the term "linear address space" refers to a memory addressing scheme used where the addresses are set in a consecutive block of addresses as one large array (this scheme is commonly used in processors today as the way in which programs view the memory available to them). Linear addressing typically simplifies programming and addressing of elements.

Paging schemes one way in which the physical memory may be mapped in modern computers, in which the linear addresses are mapped to physical memory in groups known as pages. A page table being indexed by part of the linear address bits may be used to define the translation of the linear address to a physical address. The order in which physical pages are organized in memory may be different than the linear map. The page table may be one-level (single indexing) or multi-level (using hierarchical indexing).

In such an example, MMU (Memory Management Unit) 108 may be used to translate the linear addresses of an individual DMA (Direct Memory Access) engine 104 to physical access. An MMU address translation may be done for each DMA address. For example, the MMU 108 may be reading ahead based on read-ahead address of the DMA engine 104 and toward the end of the block the address of the next block. As used herein, the term "read-ahead address" refers to an address that is to be the address of a future DMA setup. The size of the MMU 108 read-ahead may be set based on the data rate (for example 16 B when the rate is slow or 64 B when data rate is high). This can reduce the number of read operations (by reading a block of linear address to physical address translation that relates to a consecutive sequence of linear addresses), while optimizing the amount of local storage required. In addition to storage cost, over read ahead may result in redundant reads when operating with non-continuous sections. MMU 108 buffering may be managed separately for each of the data items streamed as the locality of its data usage may be associated with each of the streams and there is low to no use for these translations with other streams (as they use other linear addresses).

GMM data path logic 110 is configured to define the score operation as a mathematical function that is implemented using parallel logic. In one implementation, GMM data path logic 110 is capable of handling up to 48 elements at each cycle, and performing the accumulation of the data using a parallel tree. For example, please refer to U.S. patent application Ser. No. 13/732,329, Filed Dec. 31, 2012, and entitled "FLEXIBLE ARCHITECTURE FOR ACOUSTIC SIGNAL PROCESSING ENGINE", the contents of which are expressly incorporated herein in their entirety.

As will be described in greater detail below, mixture component mean vectors (e.g. Mean), variance vectors (e.g. Var), Gaussian constants (e.g., Gconst), and/or feature vectors may be streamed in and GMM scores are streamed out of GMM data path logic 110 via DMAs 104.

GMM read/write memory complex 112 may operated to allow the hardware of GMM Accelerator 100 to read/write data at any time the GMM Accelerator 100 is running In some implementations an interrupt may be generated via interrupt generation logic 114 when GMM data path logic 110 stops execution. For example, The GMM scoring operation may be executed until one of the following events occurs: 1) GMM Scoring is completed; in which case all results are written to memory and the completion status is set; 2) GMM encountered an error; in which case the proper error bit is set hinting on the type of error that was detected; 3) GMM operation was suspended, due to reach a breakpoint which was set prior to the last activation or resume; 4) GMM operation was suspended due to a pause in operation; and/or 5) An abort was indicated. Such an abort operation may reset internal state of the GMM and clears the various error conditions that may be in its registers. When stopped by any reason other than Abort, SW (software) may review internal status information, status bit, performance counters etc. An abort operation is later used to return the GMM module to a state ready for re-activation. When in one of the two Suspended states, SW may choose to resume the GMM Scoring operation from the point at which it was stopped.

Figure 2:
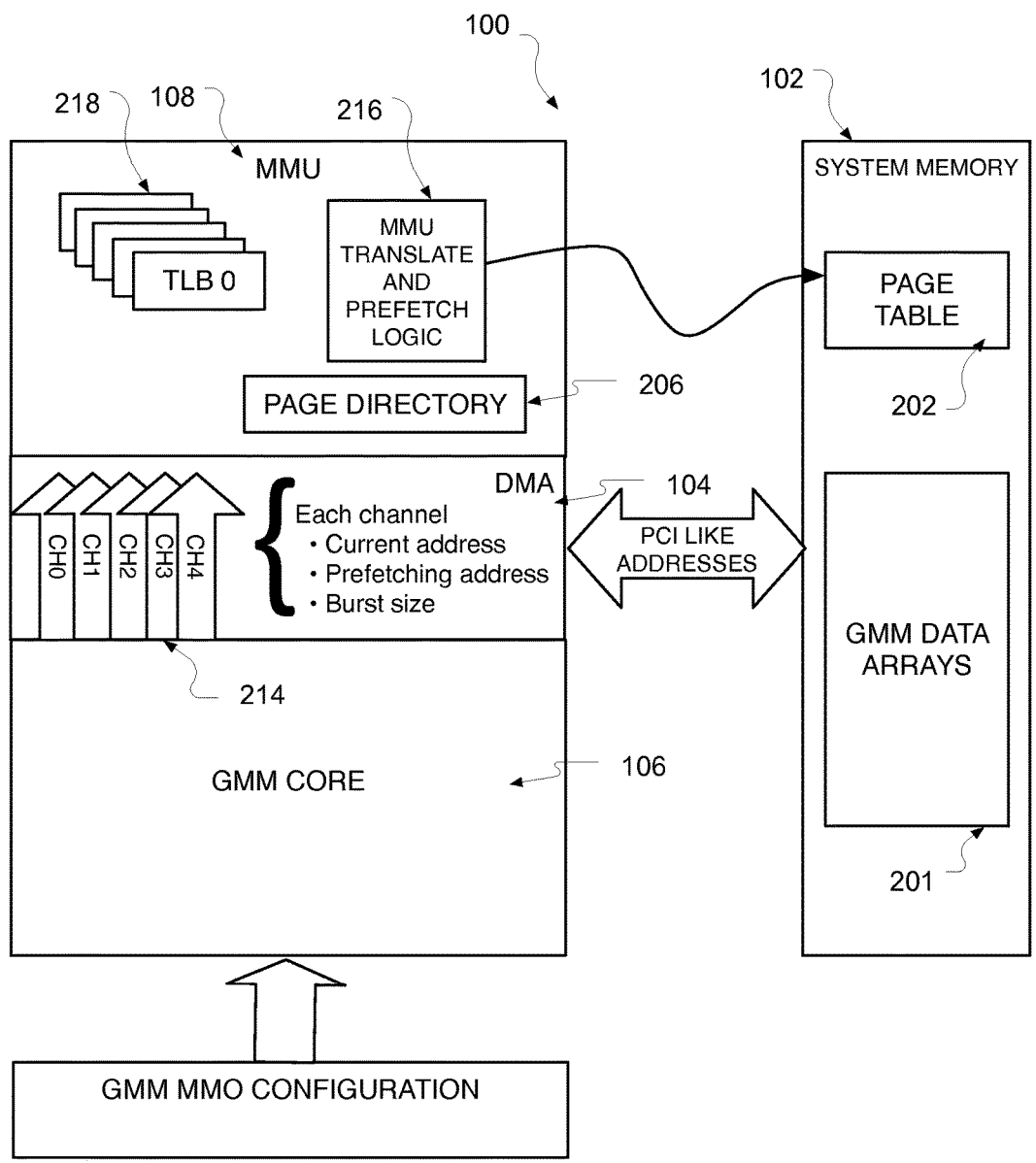
FIG. 2 is an illustrative diagram of operation of an example GMM (Gaussian Mixture Model) scheme.

FIG. 2 is an illustrative diagram of operation of an example GMM (Gaussian Mixture Model) GMM Accelerator 100 in operation, and arranged in accordance with at least some implementations of the present disclosure. In various implementations, GMM Accelerator 100 may use large amount of data (e.g. GMM data arrays 201) that may be accessed via a private page table 202. This private page table 202 in system memory 102 may be configured before a scoring operation is triggered. The assignment of memory in private page table 202 is typically static to allow the lock operation, the page tables 202 (and the corresponding page directory 206) to be constructed once. For example, such a "lock operation" may refer to a page-lock of the OS that may prevent pages from being swapped out as part of OS memory management. However, it may be changed as required while GMM Accelerator 100 is not performing a GMM scoring operation. Alternately, technologies such as Shared Virtual Memory (SVM, e.g., https://software.intel.com/en-us/articles/opencl-20-shared-virtual-memory-overview) may allow the mapping operation to be done without locking of the physical pages, a similar structure that utilize the spatial locality of access can be extended to that environment as well.

As discussed above, the main group of elements available for each of the GMM states and includes the following arrays: mixture component mean vectors (e.g. Mean), variance vectors (e.g. Var), Gaussian constants (e.g., Gconst), and/or feature vectors (e.g., FV), which may be streamed in and GMM scores are streamed out of GMM data path logic 110 via DMAs 104. For example, the GMM Accelerator 100 as disclosed herein may typically include a math processing element and a set of data feeding engines that guarantee efficient data streaming, using minimal buffering on one hand and an efficient multi-stream pipelining on the other. Some portions of the data (e.g., Var, Mean, Gconst and in some cases active list (ACT)) may be streamed with a variable rate (e.g., a rate that may be variable and automatically adjusted to the data consumption rate). Some portion of the data (referred to herein as a "Feature Vector") may be re-used during the operation, being read at the beginning and then re-used from a buffer within the module. Results may be streamed to memory as they become ready.

Page directory 206 may be loaded to the GMM Accelerator 100 HW (hardware) registers before scoring can be started. In many cases this is set once when memory is allocated, but it may be changed at any time when GMM Accelerator 100 is not performing a scoring operation. Page directory 206 may be implemented as an array of registers in MMU 108 module. Such an implementation may prevent the need to fetch the first level of the page table translation from memory on a miss. Alternately, it may be implemented as an array in memory that a register in MMU holds an address to and be read on demand from memory, or it may be in memory and read to registers upon activation of the GMM score operation.

The GMM registers (not shown) that define the score operation data element size, data element count, data location and stride may be set prior to the module's activation, and should not be changed while the GMM scoring is executing.

The GMM scoring operation may be executed until one of the following events occurs: 1) GMM Scoring is completed; in which case all results are written to memory and the completion status is set; 2) GMM encountered an error; in which case the proper error bit is set hinting on the type of error that was detected; 3) GMM operation was suspended, due to reach a break-point which was set prior to the last activation or resume; 4) GMM operation was suspended due to a pause in operation; and/or 5) An abort was indicated. Such an abort operation may reset internal state of the GMM and clears the various error conditions that may be in its registers. When stopped by any reason other than Abort, SW (software) may review internal status information, status bit, performance counters etc. An abort operation is later used to return the GMM module to a state ready for re-activation. When in one of the two Suspended states, SW may choose to resume the GMM Scoring operation from the point at which it was stopped.

As discussed in previous sections, most of the data that is used by the GMM is stored in main system memory 102. The GMM Accelerator 100 may read the data during the score execution and writes results back to memory system memory 102 before indicating to SW (software) that the scoring operation is completed.

These read and write operations are performed using DMA 104 operations to memory. DMA 104 may use multiple streams of data (e.g., where individual streams may be assigned to individual DMA channels 214) to reduce the amount of data that needs to be stored inside the DMA 104 module. Additionally or alternatively, DMA 104 may use a pre-fetch mechanism 216 (e.g., MMU translate and prefetch logic 216) to improve data availability and cover for memory latency.

During its operation, the GMM Accelerator 100 may be using DMA 104 operations to read-write data from/to main system memory 102. Both the DMA 104 driver and GMM may refer to the same linear space for data addressing. DMA 104 may be configured with pointers to the different memory structures as will be discussed later on. MMU 108 may be translating these addresses to the physical address using a mapping scheme.

For example, Translation Look aside Buffer(s) (TLB) 218 may be used as a caching mechanism to reduce the number of memory access operations required for addressing the physical memory. Translation Look aside Buffer(s) (TLB) implementations may include a cache scheme where each TLB entry includes a tag that indicates what is the physical address associated with it (levels of indexing may be used to reduce overlap). In the case of the GMM, by using a block of linear addresses, the TLB may include only a single tag (and thus needs to only search this single tag) for a group of consecutive addresses pre-fetched for a specific DMA stream. This may reduce the amount of storage required and at the same time reduce the number of tags that needs to be compared too.

Since address translated in the TLB 218, address in the Page Directory 206 registers, and any data read by the GMM Accelerator 100 via a DMA 104 operation may not be monitored for coherency, it may be the responsibility of the DMA 104 driver's SW to correctly manage timing and proper flushing of state to guarantee correct operation.

Although FIG. 2 and other examples discussed herein are discussed in terms of Translation Look aside Buffer(s) (TLB), it will be appreciated that other buffer schemes may be used instead of TLBs. For example, implementations discussed herein may operate so as to read multiple translations at once using their locality behavior. In a TLB environment, TLB HW may be used as a cache later on after the reading of multiple translations at once using their locality behavior. In such an example, all TLBs may be cached, but implementations discussed herein may operate so as to use sequential access to avoid the need to hold many tags and perform complex searches. In a TLB environment, the concept of one TLB per stream of data may be used in conjunction with some of the implementations discussed herein to create this locality, although this is just an example.

As discussed above, each data element may be associated with a specific DMA channel 214. Further, each specific DMA channel 214 may likewise be associated with a specific TLB buffer 218 and set of entries. This association may be used for correct data prefetching that track the next expected data element.

Figure 3:
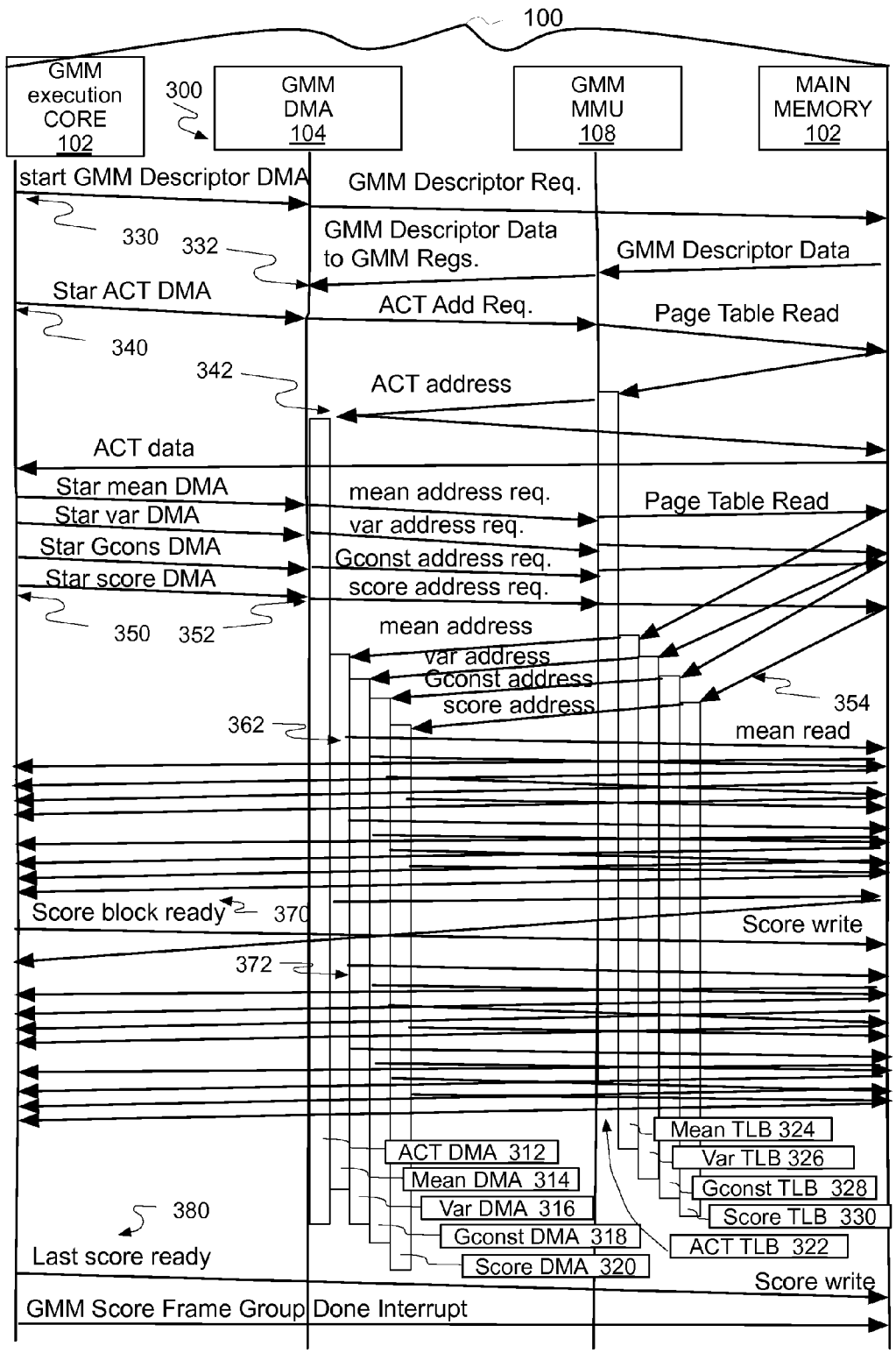
FIG. 3 is a flow chart illustrating an example scoring process.

FIG. 3 provide an illustrative diagram of an example GMM accelerator system 100 (see, e.g., FIG. 1 for more details) in operation via GMM scoring process 300, arranged in accordance with at least some implementations of the present disclosure. In the illustrated implementation, process 300 may include one or more operations, functions or actions as illustrated by one or more of actions 312, etc.

As illustrated, GMM accelerator system 100 (see, e.g., FIG. 1 for more details) may include GMM execution Core 106, GMM DMA (Direct Memory Access) 104, GMM MMU (Memory Management) 108, main memory 102, the like, and/or combinations thereof.

As discussed above, Translation Look aside Buffer(s) (TLBs) 322, 324, 326, 328, and/or 330 may be used as a caching mechanism to reduce the number of memory access operations required for addressing the physical memory.

Similarly, each data element may be associated with a specific DMA channel 312, 314, 316, 318, and/or 320.

Further, each specific DMA channel 312, 314, 316, 318, and/or 320 may likewise be associated with a specific TLB table 322, 324, 326, 328, and/or 330 and set of entries. This association may be used for correct data prefetching that track the next expected data element. More importantly, as illustrated the data read may be done in parallel for all streams in such a way that the data read may be throttled in response to an indication of the availability of space in target buffer on a stream-by-stream basis. The parallel nature of data read may be implemented as a time multiplex over a common memory bug.

As discussed above, the main group of elements available for each of the GMM states and includes the following arrays: mixture component mean vectors (e.g. Mean), variance vectors (e.g. Var), Gaussian constants (e.g., Gconst), and/or feature vectors (e.g., FV), which may be streamed in and GMM scores are streamed out via DMAs 104. For example, the GMM Accelerator 100 as disclosed herein may typically include a math processing element and a set of data feeding engines that guarantee efficient data streaming, using minimal buffering on one hand and an efficient multi-stream pipelining on the other. Some portions of the data (e.g., Var, Mean, Gconst and in some cases active list (ACT)) may be streamed with a rate set (e.g., a rate set by the data consumption rate). Some portion of the data (referred to herein as a "Feature Vector") may be re-used during the operation, being read at the beginning and then re-used from a buffer within the module. Results may be streamed to memory as they become ready.

For example, one possible sequence of operations may be as follows:

As illustrated, process 300 may begin at operation 330, where software may enable and configure the GMM score operation setup (one time) (e.g., as may be done via setup registers (not shown here)).

Before operation 330, software may configure the GMM MMIO registers with the proper parameters for the given GMM scoring operation and activate the GMM scoring operation. As discussed above, such scoring operations may involve mixture component mean vectors (e.g. Mean), variance vectors (e.g. Var), Gaussian constants (e.g., Gconst), and/or feature vectors, which may be streamed in and GMM scores are streamed out via DMAs 104. In this example the parameters may be read from memory (with the GMM descriptor); alternatively, the parameters may be written to registers by SW (as described earlier above). The GMM hardware may use this data to read the detailed setup from memory to registers within the module. This read operation may be skipped in some cases when SW is writing the data directly to the GMM module registers. Using the setup of the GMM score operation, the GMM module starts DMA operation sequence by setting up the DMA engines 104 to the proper read/write operations. For example, the DMAs 104 may be set based at least in part on the feature vector size, mean size, variance vector size, Gaussian constant size, score size, Active list size, the like, and/or combinations thereof. Some DMA operation setup may also depend on the result of other DMA operations. For example, the data return as part of the ACT list read is used as part of base address calculation for MEAN, VAR and Const.

Process 300 may continue at operation 340, where GMM execution core 106 may select a GMM from a set of GMMs. For example, such a GMM may be selected sequentially, or as illustrated here, be selected from a non-sequential Active list (ACT).

As used herein the term "ACT" may refer to a GMM Active list that may provide a non-sequential ordering of the GMM that will executed from the set of the GMMs as they are pointed to by the GMM Active list. For example, such a GMM Active list may be in use when Active State List mode is enabled. This array may not be in use during sequential mode. The active list (ACT) may hold a list of GMM State indexes to be scored.

Process 300 may continue at operation 342, where, to start the Active list read operation, the DMA 104 triggers a read using the linear address of the Active list. The request is sent to the MMU which attempts to convert it to a physical address, since the MMU does not have the required information, it triggers a read to the page table that returns the page address of the Active list (Active address), using this information the MMU translates the DMA address to a physical address, and the DMA 104 can perform a read operation from memory which will return with the Active list data (which is an index of the first set of Active elements). Note that the return data typically include more than what is immediately required, in which case, the remaining data is stored in the Active List buffer and is used for later steps of the operation. The Index in the Active list element read, is then used to calculate the starting point of other DMA (not shown in FIG. 3).

Process 300 may continue at operation 350, where, in response to receiving GMM data associated with a selected GMM, GMM execution core 106 may begin execution of scoring the selected GMM.

At operation 352, hardware may start the DMA 104 operation using multiple read requests that are issued in parallel address requests corresponding with individual DMA channels 314, 316, 318, and/or 320.

As described above, vector data types may include vector data including: a mixture component mean vector, a variance vector, a Gaussian constant vector, a score vector, and/or a feature vector, the like, and/or combinations thereof. As will be discussed in more detail below, each vector data types may have its own corresponding data organization.

In such examples, there may be an MMU buffer per sequential stream of variable data, where each individual MMU buffer may hold a set of data elements that belong to that stream (with one type of variable data) using the spatial locality of the linear address of the data items and the sequential behavior of the associated stream. For example, the spatial locality of the linear address and the sequential behavior of the associated "mean" stream may be different from another stream (e.g., the spatial locality of the linear address and the sequential behavior of the associated "var" stream).

As used herein the term "Mean[s]" may refer to a Mean value. The Mean may be indicated as M[m,n] with m being the number of mixtures in each state and n being the number of elements in the feature vector. This structure may be repeated for each GMM state. For example, the Mean may be a 2-D array, which includes an element for each vector (first index) and a row for each mixture component (second index). This may be denoted as Mean[m,n]. The size of each element in the mean vector may be defined by Mean Vector Width in byte (e.g., in the MVWIDTH register).

As used herein the term "Var[s]" may refer to an inverse covariance. The Var may be indicated as V[m,n] with same or similar syntax as the Mean. The Inverse Var (denoted as Var) may be a 2-D array, which may include an element for each vector (first index) and a row for each mixture component (second index). This is denoted as Var[m,n]. The size of each element in the mean vector may be defined by Variance Vector Width in byte in the VVWIDTH register.

As used herein the term "Gconst" may refer to a Gaussian Constant. The Gconst may be denoted as W[m] with m being the number of mixtures in each state. For example, the Gconst may be a 1-D array, which may include an element for each mixture component in the state.

As used herein the term "FV" may refer to some portion of the data (referred to herein as a "Feature Vector" that may be re-used during the operation, being read at the beginning and then re-used from a buffer within the module. Such a feature vector may hold a set of values for each audio frame (or other data type not limited to audio frames); these are the input data that are being evaluated. For example, the GMM feature vector array may include a 1-D array for each feature vector, denoted as FV[n]. Multiple (e.g., up to 8) feature vectors may be assigned as a 2-D array.

As used herein the term "Score" may refer to a GMM Score (GScore). Such a Score may hold the result of the scoring, per each of the feature vectors, and the mixture components. The GMM score may be the output of the GMM operation. A one score number may be saved for each GMM state and feature vector. The scores may be stored in the order of GMM stage execution (e.g., state index for a sequential mode; or at the order defined by an active list in the Active List mode (ACT)).

At operation 354, the MMU 108 will load page table information from memory into the TLB 324, 326, 328, and/or 330 as required.

Additionally, prefetching may be applied for both GMM MMU 108 entries and data structures to avoid wait to memory operations. GMM MMU 108 may read a portion of page table data at a time (e.g., for ACT, Score and FV), and may also pre-fetch the next address set applied when the last data address is used. Such a pre-fetch may be based on information provided by the GMM execution core 106 on the location of the next element of data is located (e.g., not sequential in the case where a non-sequential Active list is used). In such an example, there may be an MMU buffer per sequential stream, where each individual MMU buffer may read a group of addresses that belong to that stream using the spatial locality of the linear address and the sequential behavior of the associated stream.

Process 300 may continue at operation 362, where DMAs 104 may operate using parallel DMA operations via individual DMA channels 314, 316, 318, and/or 320. For example, DMAs 104 may facilitate read/write operations between GMM execution core 106 and main memory 102 until a score has been calculated via GMM execution core 106. The DMA engine will bring data into buffer 112 until for each of the streams until the buffer is full at that point the DMA is stalled until the GMM execution core 106 uses part of the data in the buffer and there is room in that buffer for at least one chunk of read data (e.g., 64 B). When such room is made available, the DMA is signaled to issue a read for the next data chuck. Note that the DMA is programed by control logic of GMM execution core 106 for large blocks of data that typically include multiple chunks. The flow control over the DMA is via DMA controls (See, e.g., "DMA control" in FIG. 1).

Process 300 may continue at operation 370, where a score calculated via GMM execution core 106 may be written to main memory via the memory interface 102.

Process 300 may continue at operation 372, where DMAs may continue to facilitate read/write operations between GMM execution core 106 and main memory 102 until the data required to calculate the last score was read. Write operation 370 may be repeated until the last score has been calculated via GMM execution core and can be written to memory via a write operation 380.

Process 300 may continue to repeat through operation 380, where the last score may be determined and an interrupt may be generated indicating that the scoring operation is done.

Additional and/or alternative details regarding process 300 may be found below with regard to FIG. 4 and/or 5.

Figure 4:
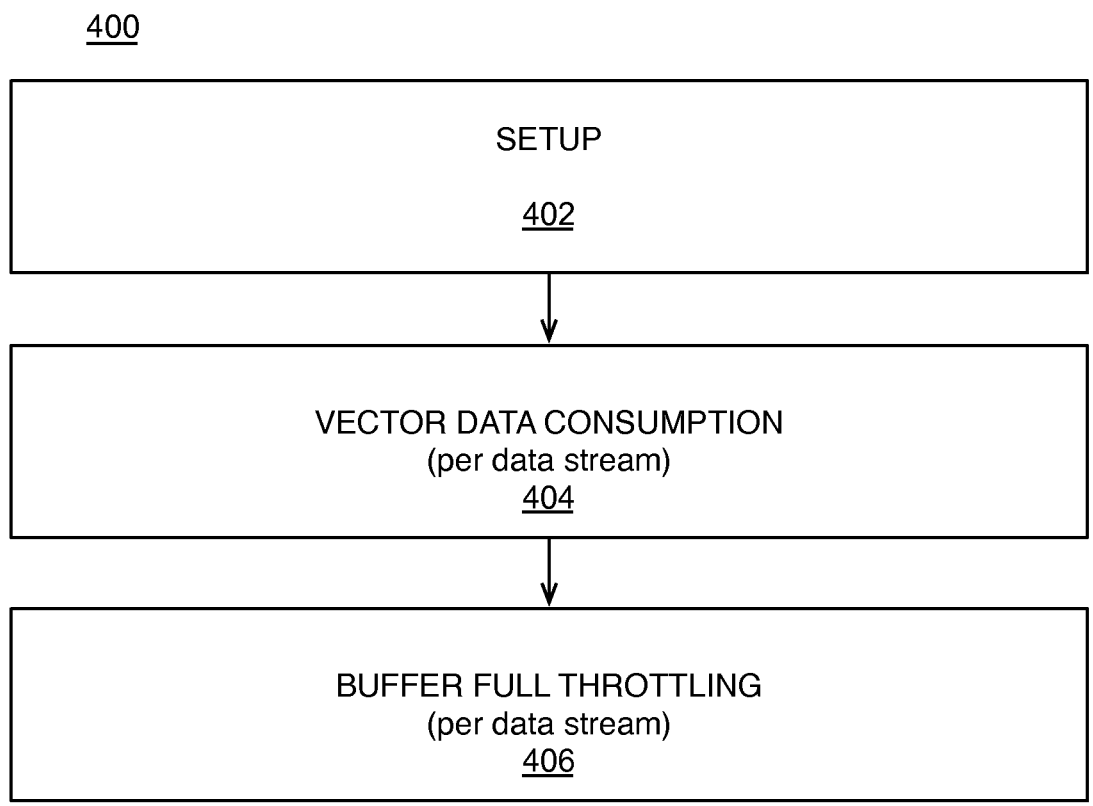
FIG. 4 is a flow chart illustrating an example scoring process.

FIG. 4 is a flow diagram illustrating an example scoring process 400, arranged in accordance with at least some implementations of the present disclosure. Process 400 may include one or more operations, functions or actions as illustrated by one or more of operations 402, etc.

Process 400 may begin at operation 402, "SETUP", where a scoring operation associated with a plurality of vector data types may be setup. For example, a scoring operation associated with a plurality of vector data types may be setup on a plurality of DMA(s) via the execution core.

For example, various vector data streams associated with corresponding vector data types may be individually distributed among a plurality of direct memory access engines (DMA(s)) via execution core 106. For example, execution core 106 may set up the DMA operations (e.g., whenever the access is not sequential), where execution core 106 may operate according to the operations setup (e.g., GMM operations) done by the host. As discussed above, DMA(s) 104 may operate on a stream-by-stream basis. Accordingly, execution core 106 may setup a single DMA 104 to process a single vector data stream associated with a corresponding with a single vector data type. Accordingly, a first vector data stream may be processed via a first direct memory access engine and a second different vector data stream may be processed via a second different direct memory access engine. DMA engines may be re-assigned to a different task (e.g., data stream) depending on phases of operation.

Process 400 may continue at operation 404, "VECTOR DATA CONSUMPTION", where vector data may be consumed. For example, vector data stored in data buffers may be consumed by the execution core. For example, execution core 106 may consume such vector data during a scoring operation. For example, such a scoring operation may include a Gaussian Mixture Model (GMM)-type scoring operation, Affine Neural Network operations, Diagonal Matrix multiplication, Recurrent Neural Networks, Copy Operations, the like, and/or combinations thereof. For example, such a GMM-type scoring operation might be utilized in voice recognition operations to output a top-scoring match.

Process 400 may continue at operation 406, "BUFFER FULL THROTTLING", where throttling may be performed based at least in part on buffer fullness. For example, throttling may be performed based at least in part on buffer fullness, where DMA(s) 104 may start or stop data requests in response to an indication from data buffers that a buffer associated with a given stream is full.

In such an example, there may be a buffer per sequential stream, where each individual buffer may read a group of addresses that belong to that stream using the spatial locality of the linear address and the sequential behavior of the associated stream.

In some implementations, DMAs may facilitate read/write operations between the execution core and the main memory until a score has been calculated via the execution core. The DMA engine will bring data into the buffers until for each of the streams the buffer is full. At that point the DMA (e.g., the DMA associated with the full buffer) is stalled until the execution core uses part of the data in the buffer and there is room in that buffer for at least one chunk of read data (e.g., 64 B). When such room is made available, the DMA is signaled to issue a read for the next data chuck. Note that the DMA is programed by control logic of GMM execution core 106 for large blocks of data that typically include multiple chunks. The flow control over the DMA is via DMA controls (See, e.g., "DMA control" in FIG. 1).

Additional and/or alternative details regarding process 400 may be found below with regard to FIG. 5.

Figure 5:
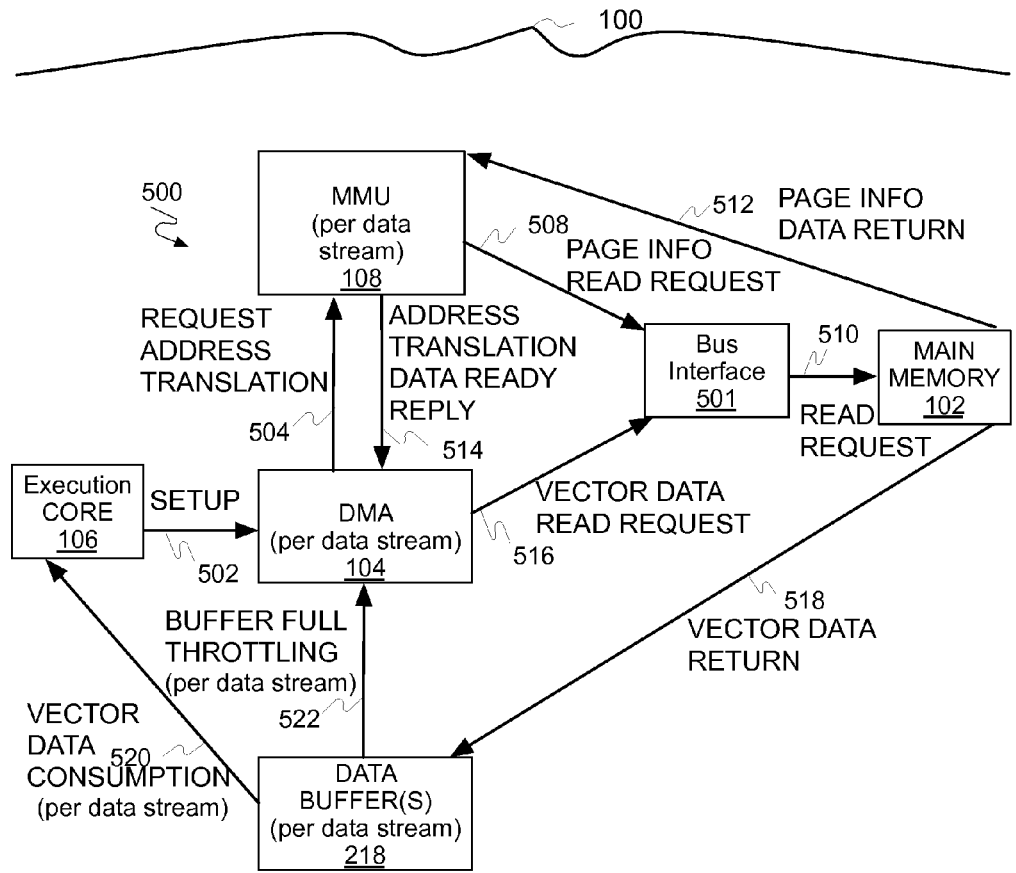
FIG. 5 is a flow chart illustrating an example scoring process.

FIG. 5 provide an illustrative diagram of an example accelerator system 100 (see, e.g., FIG. 1 for more details) in operation via scoring process 500, arranged in accordance with at least some implementations of the present disclosure. In the illustrated implementation, process 500 may include one or more operations, functions or actions as illustrated by one or more of actions 512, etc.

As illustrated, accelerator system 100 (see, e.g., FIG. 1 for more details) may include execution Core 106, DMA (Direct Memory Access) 104, MMU (Memory Management) 108, main memory 102, the like, and/or combinations thereof.

Process 500 may begin at operation 502, "SETUP", where a scoring operation associated with a plurality of vector data types may be setup. For example, a scoring operation associated with a plurality of vector data types may be setup on a plurality of DMA(s) via execution core 106.

For example, various vector data streams associated with corresponding vector data types may be individually distributed among a plurality of direct memory access engines (DMA(s)) via execution core 106. For example, execution core 106 may set up the DMA operations (e.g., whenever the access is not sequential), where execution core 106 may operate according to the operations setup (e.g., GMM operations) done by the host. As discussed above, DMA(s) 104 may operate on a stream-by-stream basis. Accordingly, execution core 106 may setup a single DMA 104 to process a single vector data stream associated with a corresponding with a single vector data type. Accordingly, a first vector data stream may be processed via a first direct memory access engine and a second different vector data stream may be processed via a second different direct memory access engine. DMA engines may be re-assigned to a different task (e.g., data stream) depending on phases of operation.

As described above, such vector data types may include vector data including: a mixture component mean vector, a variance vector, a Gaussian constant vector, a score vector, and/or a feature vector, the like, and/or combinations thereof. In one example, in GMM scoring, some portions of the vector data (e.g., Var, Mean, Const and in some cases active list) may be streamed with a rate resulting from the data consumption rate. Meanwhile, another portion of the data (referred to herein as a "Feature Vector") may be re-used during the operation, being read at the beginning and then re-used from a buffer within the module.

Process 500 may continue at operation 504, "REQUEST ADDRESS TRANSLATION", where address translation requests may be transferred. For example, address translation requests may be transferred between DMA(s) 104 and MMU 108.

As discussed above, DMA(s) 104 may operate on a stream-by-stream basis. Accordingly, such address translation requests may be transferred between DMA(s) 104 and MMU 108 on a stream-by-stream basis.

Process 500 may continue at operation 508, "PAGE INFO READ REQUEST", where a page info read request may be transferred. For example, a page info read request may be transferred between MMU 108 and bus interface 501.

In such an example, this page info may include relevant parts of the page table discussed before and in some cases may involve a sequence of such read operations in some cases of hierarchical page tables. The unit 501 may arbitrate between this request and possibly other pending requests and send them to the Main memory 102 as "READ REQUEST" as discussed below at operation 510.

As discussed above, DMA(s) 104 may operate on a stream-by-stream basis. Similarly, MMU 108 may also operate on a stream-by-stream basis. Accordingly, such vector data read request may be transferred between MMU 108 and bus interface 501 on a stream-by-stream basis.

In some implementations, MMU 108 may read information related to multiple pages at the same time and store it into its buffer. Such operations take advantage of the fact that the page information is smaller than a single read from memory and that the operation of the DMA 104 is sequential; accordingly, the spatial locality of page descriptors may be used to Prefetch the page information and by that reduce the amount of memory accesses required.

Additionally, page directory data may be primarily stored in registers of the Memory Management Unit 108.

Process 500 may continue at operation 510, "READ REQUEST", where read requests may be transferred. For example, read requests (e.g., page info read requests 508 and/or vector data read requests 516, as described below) may be transferred from bus interface 501 to main memory 102.

Process 500 may continue at operation 512, "PAGE INFO DATA RETURN", where page info data may be returned. For example, page info data may be returned between main memory 102 and MMU 108 in response to the page info read request from MMU 108.

Process 500 may continue at operation 514, "ADDRESS TRANSLATION DATA READY REPLY", where an address translation data ready reply may be transferred. For example, an address translation data ready reply may be transferred between MMU 108 and DMA 104.

Process 500 may continue at operation 516, "VECTOR DATA READ REQUEST", where a vector data read request may be transferred. For example, a vector data read request may be transferred between DMA(s) 104 and bus interface 501 in response to DMA(s) 104 receiving an address translation data ready reply.

As discussed above, DMA(s) 104 may operate on a stream-by-stream basis. Accordingly, such vector data read request may be transferred between DMA 104 and bus interface 501 on a stream-by-stream basis.

Process 500 may continue at operation 518, "VECTOR DATA RETURN", where vector data may be returned. For example, vector data may be returned to data buffers 218 from main memory 102 in response to a vector data read request from DMA(s) 104.

As discussed above, DMA(s) 104 may operate on a stream-by-stream basis. Similarly, data buffers 218 may also operate on a stream-by-stream basis. Accordingly, such returned vector data may be transferred between main memory 102 and data buffers 218 on a stream-by-stream basis.

In such an example, there may be a buffer per sequential stream, where each individual MMU buffer may read a group of addresses that belong to that stream using the spatial locality of the linear address and the sequential behavior of the associated stream.

For example, one type of vector data associated with a first vector data stream may be loaded from main memory 102 into a first Translation Look aside Buffer-type data buffer 218 (although this is only one example buffer type); and likewise a second different type of vector data may be loaded from main memory 102 into a second different Translation Look aside Buffer-type data buffer 218.

Process 500 may continue at operation 520, "VECTOR DATA CONSUMPTION", where vector data may be consumed. For example, vector data stored in data buffers 218 may be consumed by execution core 106. For example, execution core 106 may consume such vector data during a scoring operation. For example, such a scoring operation may include a Gaussian Mixture Model (GMM)-type scoring operation, Affine Neural Network operations, Diagonal Matrix multiplication, Recurrent Neural Networks, Copy Operations, the like, and/or combinations thereof. For example, such a GMM-type scoring operation might be utilized in voice recognition operations to output a top-scoring match.

As discussed above, DMA(s) 104 may operate on a stream-by-stream basis. Similarly, data buffers 218 may also operate on a stream-by-stream basis. Accordingly, such vector data consumption may involve transferred between data buffers 218 and execution core 106 on a stream-by-stream basis.

Process 500 may continue at operation 522, "BUFFER FULL THROTTLING", where throttling may be performed based at least in part on buffer fullness. For example, throttling may be performed based at least in part on buffer fullness, where DMA(s) 104 may start or stop data requests (e.g., vector data read requests 516 and/or address translation requests 504) in response to an indication from data buffers 218 that a buffer associated with a given stream is full.

As discussed above, DMA(s) 104 and/or data buffers 218 may operate on a stream-by-stream basis. Accordingly, such throttling may be performed on a stream-by-stream basis.

In one example, data consumption may be controlled based at least in part on the fullness of the various Translation Look aside Buffers. For example, data consumption may be controlled by throttling first direct memory access engine requests to main memory based at least in part on the fullness of the various Translation Look aside Buffers of Memory Management Unit.

In some implementations, DMAs 104 may facilitate read/write operations between execution core 106 and main memory 102 until a score has been calculated via execution core 106. The DMA engine will bring data into buffer 112 until for each of the streams until the buffer is full. At that point the DMA is stalled (e.g., the DMA associated with the full buffer) until execution core 106 uses part of the data in the buffer and there is room in that buffer for at least one chunk of read data (e.g., 64 B). When such room is made available, the DMA is signaled to issue a read for the next data chuck. Note that the DMA is programed by control logic of execution core 106 for large blocks of data that typically include multiple chunks. The flow control over the DMA is via DMA controls (See, e.g., "DMA control" in FIG. 1).

Process 500 may return to operation 502, where setup may continue to recur until the last score has been computed. For example, such setup may be based on a next GMM address set, which may be prefetched based at least in part on a non-sequential Active list of GMM data elements. For example, a next GMM address set may be prefetched, via the Memory Management Unit, based at least in part on a non-sequential Active list of GMM data elements prior to completion of scoring of the current GMM data element.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated. Additionally, although one particular set of blocks or actions is illustrated as being associated with particular modules, these blocks or actions may be associated with different modules than the particular modules illustrated here.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor may provide the functionality described herein. The computer program products may be provided in any form of computer readable medium. Thus, for example, a processor including one or more processor core(s) may undertake one or more of the blocks shown in FIGS. 3, 4, and 5 in response to instructions conveyed to the processor by a computer readable medium.

Figure 6:
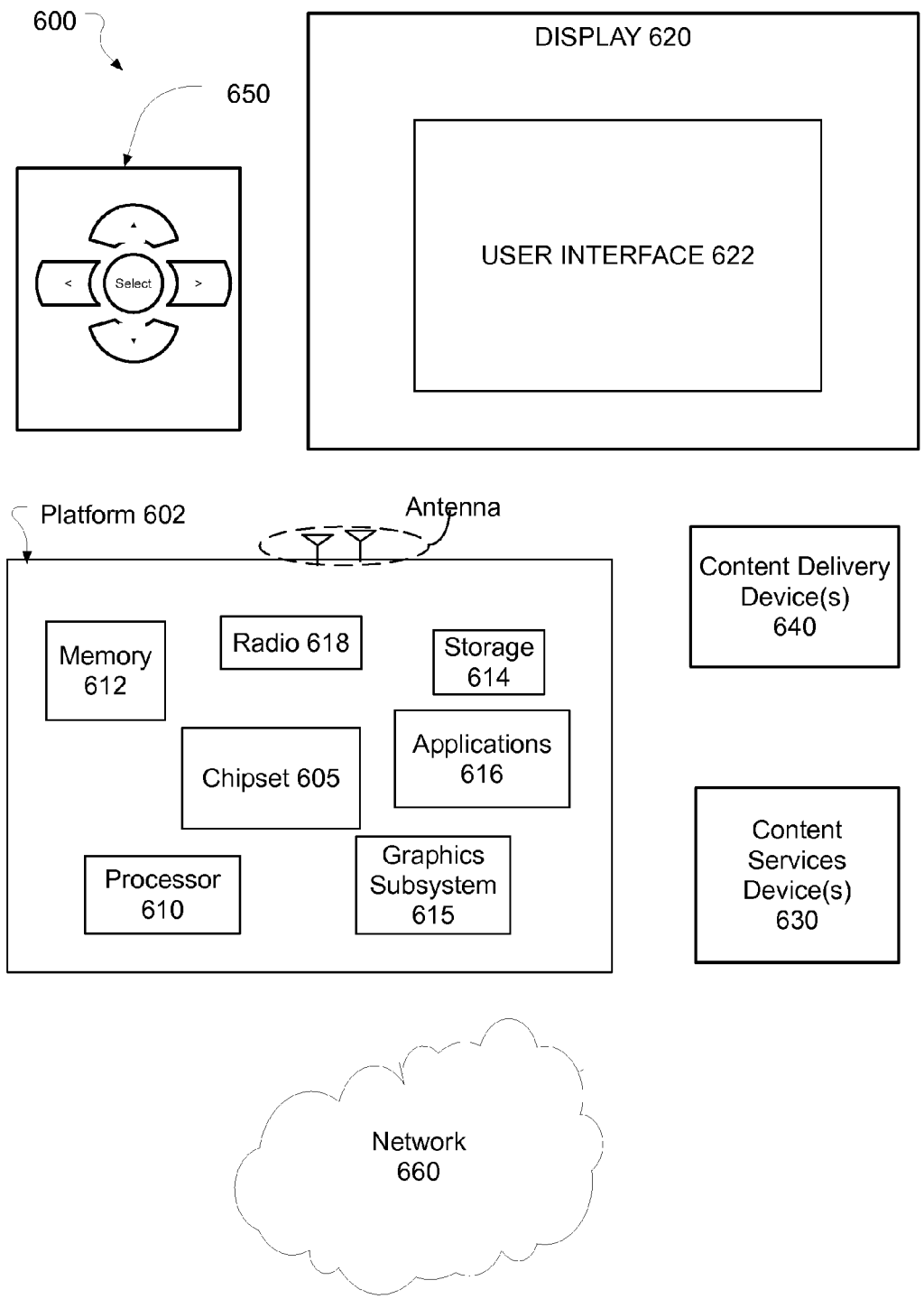
FIG. 6 is an illustrative diagram of an example system.

FIG. 6 illustrates an example system 600 in accordance with the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, Display Port, wireless HDMI, and/or wireless HD compliant techniques. Graphics subsystem 615 may be integrated into processor 610 or chipset 605. In some implementations, graphics subsystem 615 may be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 6.1 surround sound audio and/or high definition (7.1) surround sound audio, for example. Drivers may include a graphics driver for integrated graphics platforms. In embodiments, the graphics driver may include a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
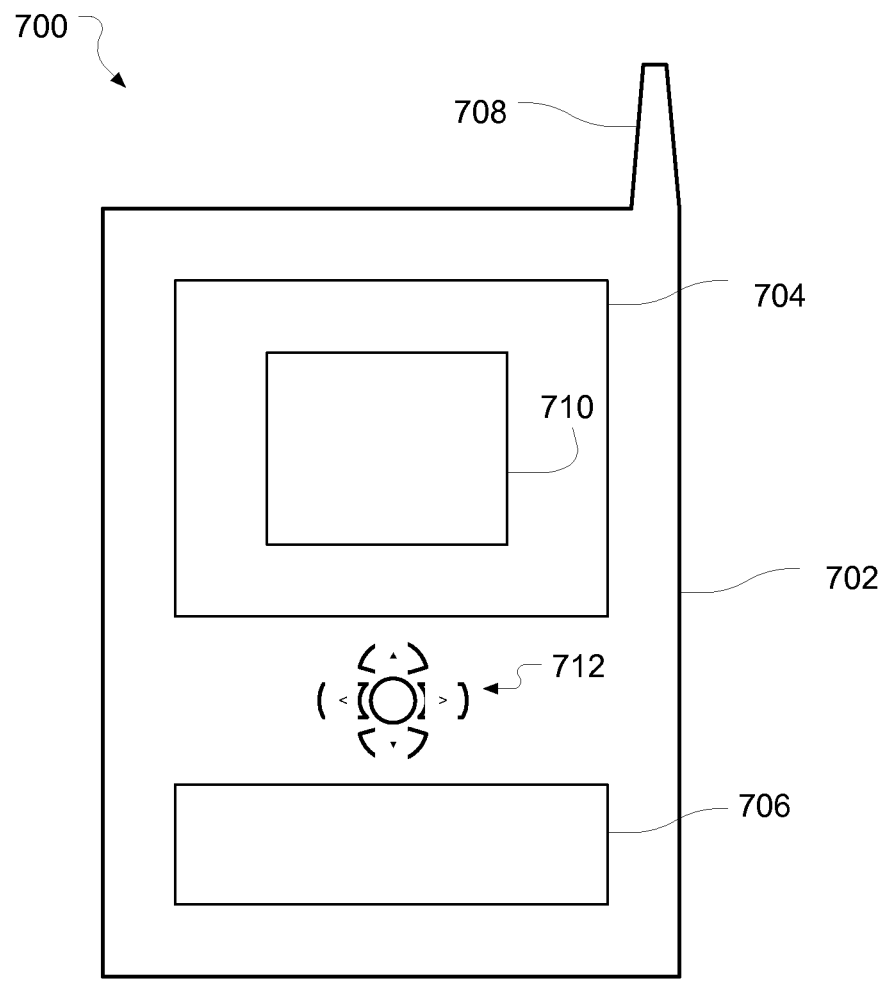
FIG. 7 is an illustrative diagram of an example system, all arranged in accordance with at least some implementations of the present disclosure.

As described above, system 600 may be embodied in varying physical styles or form factors. FIG. 7 illustrates implementations of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for scoring operations may setting up, via an execution core, a scoring operation associated with a plurality of vector data types on a plurality of direct memory access engines on a stream-by-stream basis where a single vector data stream associated with a corresponding single vector data type is set up for processing via a corresponding single direct memory access engine. The execution core may consume vector data stored in a plurality of data buffers during the scoring operation, where the vector data is consumed in a stream-by-stream basis. An indication that a given buffer associated with a given stream is has a certain fullness may be transferred between the data buffers and the direct memory access engines, where the transfer between the data buffers and the direct memory access engines is on a stream-by-stream basis. The direct memory access engines may throttle data requests so as to stop and/or start such data requests in response to the indication from the data buffers that a given buffer associated with a given stream has a certain fullness, where the throttling is on a stream-by-stream basis.

In another example, a computer-implemented method for scoring operations may further include requesting, between the direct memory access engines and a memory management unit, an address translation on a stream-by-stream basis. Page info read requests may be transferred on a stream-by-stream basis, between the memory management unit and a bus interface, where the page info includes a sequence of read operations of relevant parts of a hierarchical page table. The page info read requests may be transferred between the bus interface and a main memory, where the bus interface arbitrates between pending requests. Page info data may be returned, between the main memory and the memory management unit, in response to the page info read request from the memory management unit. Address translation data ready replies may be transferred, between the memory management unit and the direct memory access engines. Vector data read requests may be transferred between the direct memory access engines and the bus interface on a stream-by-stream basis in response to the direct memory access engines receiving an address translation data ready reply. The vector data read requests may be transferred between the bus interface and the main memory, where the bus interface arbitrates between pending requests. Vector data may be returned between the main memory and the data buffers on a stream-by-stream basis in response to the vector data read requests, where one type of vector data associated with one vector data stream is loaded from the main memory into one buffer, and where each individual buffer reads a group of addresses that belong to the associated vector data stream using a spatial locality of the linear address and the sequential behavior of the associated vector data stream. The vector data may be transferred between the data buffers and the execution core on a stream-by-stream basis. One or more of the direct memory access engines may be re-assigned, via the execution core, to a different vector data stream depending on phases of the scoring operation until the last score has been computed. The scoring operation may include one or more of the following scoring operation types: Gaussian Mixture Model (GMM), Affine Neural Network operations, Diagonal Matrix multiplication, Recurrent Neural Networks, and/or Copy Operations. The scoring operation may be utilized in voice recognition operations to output a top-scoring match. The vector data types may include one or more data types including: a mixture component mean vector, a variance vector, a Gaussian constant vector, a score vector, and/or a feature vector.

In other examples, a system for scoring operations on a computer may include an execution core configured to set up a scoring operation associated with a plurality of vector data types on a plurality of direct memory access engines on a stream-by-stream basis where a single vector data stream associated with a corresponding single vector data type is set up for processing via a corresponding single direct memory access engine. A plurality of data buffers may be configured to store vector data associated with the scoring operation. The execution core may be further configured to consume the vector data stored in the plurality of data buffers during the scoring operation, where the vector data is consumed in a stream-by-stream basis. A plurality of direct memory access engines may be configured to transfer, between the data buffers and the direct memory access engines, an indication that a given buffer associated with a given stream is has a certain fullness, where the transfer between the data buffers and the direct memory access engines is on a stream-by-stream basis. The direct memory access engines may be further configured to throttle data requests so as to stop and/or start such data requests in response to the indication from the data buffers that a given buffer associated with a given stream has a certain fullness, where the throttling is on a stream-by-stream basis. A display communicatively associated with the execution core and may be configured to output information to a user based at least in part on the scoring operation.

In another example, the system for scoring operations on a computer may further include the direct memory access engines being further configured to request, between the direct memory access engines and a memory management unit, an address translation on a stream-by-stream basis. The memory management unit may be further configured to transfer, between the memory management unit and a bus interface, page info read requests on a stream-by-stream basis, where the page info includes a sequence of read operations of relevant parts of a hierarchical page table. The bus interface may be further configured to transfer, between the bus interface and a main memory, the page info read requests, where the bus interface arbitrates between pending requests. The main memory may be configured to return, between the main memory and the memory management unit, page info data in response to the page info read request from the memory management unit. The memory management unit may be further configured to transfer, between the memory management unit and the direct memory access engines, address translation data ready replies. The direct memory access engines may be further configured to transfer, between the direct memory access engines and the bus interface, vector data read requests on a stream-by-stream basis in response to the direct memory access engines receiving an address translation data ready reply. The bus interface may be further configured to transfer, between the bus interface and the main memory, the vector data read requests, where the bus interface arbitrates between pending requests. The main memory may be configured to return, between the main memory and the data buffers, vector data on a stream-by-stream basis in response to the vector data read requests, where one type of vector data associated with one vector data stream is loaded from the main memory into one buffer, and where each individual buffer reads a group of addresses that belong to the associated vector data stream using a spatial locality of the linear address and the sequential behavior of the associated vector data stream. The data buffers may be further configured to transfer, between the data buffers and the execution core, the vector data on a stream-by-stream basis. The execution core may be further configured to re-assign one or more of the direct memory access engines to a different vector data stream depending on phases of the scoring operation until the last score has been computed. The scoring operation may include one or more of the following scoring operation types: Gaussian Mixture Model (GMM), Affine Neural Network operations, Diagonal Matrix multiplication, Recurrent Neural Networks, and/or Copy Operations. The scoring operation may be utilized in voice recognition operations to output a top-scoring match. The vector data types may include one or more data types including: a mixture component mean vector, a variance vector, a Gaussian constant vector, a score vector, and/or a feature vector.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for scoring operations, comprising:
setting up, via an execution core, a scoring operation associated with a plurality of vector data types on a plurality of direct memory access engines on a stream-by-stream basis where a single vector data stream associated with a corresponding single vector data type is set up for processing via a corresponding single direct memory access engine;
consuming, via the execution core, vector data stored in a plurality of data buffers during the scoring operation, wherein the vector data is consumed in a stream-by-stream basis;
transferring, between the data buffers and the direct memory access engines, an indication that a given buffer associated with a given stream is has a certain fullness, wherein the transfer between the data buffers and the direct memory access engines is on a stream-by-stream basis; and
throttling, via the direct memory access engines, data requests so as to stop and/or start such data requests in response to the indication from the data buffers that a given buffer associated with a given stream has a certain fullness, wherein the throttling is on a stream-by-stream basis.

2. The method of claim 1, wherein the scoring operation includes one or more of the following scoring operation types: Gaussian Mixture Model (GMM), Affine Neural Network operations, Diagonal Matrix multiplication, Recurrent Neural Networks, and/or Copy Operations.

3. The method of claim 1, wherein the scoring operation is utilized in voice recognition operations to output a top-scoring match.

4. The method of claim 1, wherein the vector data types include one or more data types including: a mixture component mean vector, a variance vector, a Gaussian constant vector, a score vector, and/or a feature vector.

5. The method of claim 1, further comprising:
requesting, between the direct memory access engines and a memory management unit, an address translation on a stream-by-stream basis; and
transferring, between the memory management unit and a bus interface, page info read requests on a stream-by-stream basis, wherein the page info includes a sequence of read operations of relevant parts of a hierarchical page table;
transferring, between the bus interface and a main memory, the page info read requests, wherein the bus interface arbitrates between pending requests; and
returning, between the main memory and the memory management unit, page info data in response to the page info read request from the memory management unit.

6. The method of claim 1, further comprising:
transferring, between a memory management unit and the direct memory access engines, address translation data ready replies;
transferring, between the direct memory access engines and a bus interface, vector data read requests on a stream-by-stream basis in response to the direct memory access engines receiving an address translation data ready reply; and
transferring, between the bus interface and a main memory, the vector data read requests, wherein the bus interface arbitrates between pending requests.

7. The method of claim 1, further comprising:
returning, between a main memory and the data buffers, vector data on a stream-by-stream basis in response to a vector data read requests, wherein one type of vector data associated with one vector data stream is loaded from the main memory into one buffer, and wherein each individual buffer reads a group of addresses that belong to the associated vector data stream using a spatial locality of a linear address and a sequential behavior of the associated vector data stream; and
transferring, between the data buffers and the execution core, the vector data on a stream-by-stream basis.

8. The method of claim 1, further comprising:
re-assigning, via the execution core, one or more of the direct memory access engines to a different vector data stream depending on phases of the scoring operation until a last score has been computed.

9. The method of claim 1, further comprising:
requesting, between the direct memory access engines and a memory management unit, an address translation on a stream-by-stream basis;
transferring, between the memory management unit and a bus interface, page info read requests on a stream-by-stream basis, wherein the page info includes a sequence of read operations of relevant parts of a hierarchical page table;
transferring, between the bus interface and a main memory, the page info read requests, wherein the bus interface arbitrates between pending requests;
returning, between the main memory and the memory management unit, page info data in response to the page info read request from the memory management unit;
transferring, between the memory management unit and the direct memory access engines, address translation data ready replies;
transferring, between the direct memory access engines and the bus interface, vector data read requests on a stream-by-stream basis in response to the direct memory access engines receiving an address translation data ready reply;
transferring, between the bus interface and the main memory, the vector data read requests, wherein the bus interface arbitrates between pending requests;
returning, between the main memory and the data buffers, vector data on a stream-by-stream basis in response to the vector data read requests, wherein one type of vector data associated with one vector data stream is loaded from the main memory into one buffer, and wherein each individual buffer reads a group of addresses that belong to the associated vector data stream using a spatial locality of a linear address and a sequential behavior of the associated vector data stream;
transferring, between the data buffers and the execution core, the vector data on a stream-by-stream basis;
re-assigning, via the execution core, one or more of the direct memory access engines to a different vector data stream depending on phases of the scoring operation until a last score has been computed; and
wherein the scoring operation includes one or more of the following scoring operation types: Gaussian Mixture Model (GMM), Affine Neural Network operations, Diagonal Matrix multiplication, Recurrent Neural Networks, and/or Copy Operations,
wherein the scoring operation is utilized in voice recognition operations to output a top-scoring match, and
wherein the vector data types include one or more data types including: a mixture component mean vector, a variance vector, a Gaussian constant vector, a score vector, and/or a feature vector.

10. A system for scoring operations on a computer, comprising:
an execution core configured to set up a scoring operation associated with a plurality of vector data types on a plurality of direct memory access engines on a stream-by-stream basis where a single vector data stream associated with a corresponding single vector data type is set up for processing via a corresponding single direct memory access engine;
a plurality of data buffers configured to store vector data associated with the scoring operation;
the execution core further configured to consume the vector data stored in the plurality of data buffers during the scoring operation, wherein the vector data is consumed in a stream-by-stream basis;
a plurality of direct memory access engines configured to transfer, between the data buffers and the direct memory access engines, an indication that a given buffer associated with a given stream is has a certain fullness, wherein the transfer between the data buffers and the direct memory access engines is on a stream-by-stream basis; and
the direct memory access engines further configured to throttle data requests so as to stop and/or start such data requests in response to the indication from the data buffers that a given buffer associated with a given stream has a certain fullness, wherein the throttling is on a stream-by-stream basis; and
a display communicatively associated with the execution core and configured to output information to a user based at least in part on the scoring operation.

11. The system of claim 10, wherein the scoring operation includes one or more of the following scoring operation types: Gaussian Mixture Model (GMM), Affine Neural Network operations, Diagonal Matrix multiplication, Recurrent Neural Networks, and/or Copy Operations.

12. The system of claim 10, wherein the scoring operation is utilized in voice recognition operations to output a top-scoring match.

13. The system of claim 10, wherein the vector data types include one or more data types including: a mixture component mean vector, a variance vector, a Gaussian constant vector, a score vector, and/or a feature vector.

14. The system of claim 10, further comprising:
the direct memory access engines further configured to request, between the direct memory access engines and a memory management unit, an address translation on a stream-by-stream basis; and
the memory management unit further configured to transfer, between the memory management unit and a bus interface, page info read requests on a stream-by-stream basis, wherein the page info includes a sequence of read operations of relevant parts of a hierarchical page table;
the bus interface further configured to transfer, between the bus interface and a main memory, the page info read requests, wherein the bus interface arbitrates between pending requests; and
the main memory configured to return, between the main memory and the memory management unit, page info data in response to the page info read request from the memory management unit.

15. The system of claim 10, further comprising:
a memory management unit configured to transfer, between the memory management unit and the direct memory access engines, address translation data ready replies;
the direct memory access engines further configured to transfer, between the direct memory access engines and a bus interface, vector data read requests on a stream-by-stream basis in response to the direct memory access engines receiving an address translation data ready reply; and
the bus interface further configured to transfer, between the bus interface and a main memory, the vector data read requests, wherein the bus interface arbitrates between pending requests.

16. The system of claim 10, further comprising:
a main memory configured to return, between the main memory and the data buffers, vector data on a stream-by-stream basis in response to a vector data read requests, wherein one type of vector data associated with one vector data stream is loaded from the main memory into one buffer, and wherein each individual buffer reads a group of addresses that belong to the associated vector data stream using a spatial locality of a linear address and a sequential behavior of the associated vector data stream; and
the data buffers further configured to transfer, between the data buffers and the execution core, the vector data on a stream-by-stream basis.

17. The system of claim 10, further comprising:
the execution core further configured to re-assign one or more of the direct memory access engines to a different vector data stream depending on phases of the scoring operation until a last score has been computed.

18. The system of claim 10, further comprising:
the direct memory access engines further configured to request, between the direct memory access engines and a memory management unit, an address translation on a stream-by-stream basis;
the memory management unit further configured to transfer, between the memory management unit and a bus interface, page info read requests on a stream-by-stream basis, wherein the page info includes a sequence of read operations of relevant parts of a hierarchical page table;
the bus interface further configured to transfer, between the bus interface and a main memory, the page info read requests, wherein the bus interface arbitrates between pending requests;
the main memory configured to return, between the main memory and the memory management unit, page info data in response to the page info read request from the memory management unit;
the memory management unit further configured to transfer, between the memory management unit and the direct memory access engines, address translation data ready replies;
the direct memory access engines further configured to transfer, between the direct memory access engines and the bus interface, vector data read requests on a stream-by-stream basis in response to the direct memory access engines receiving an address translation data ready reply;
the bus interface further configured to transfer, between the bus interface and the main memory, the vector data read requests, wherein the bus interface arbitrates between pending requests;
the main memory configured to return, between the main memory and the data buffers, vector data on a stream-by-stream basis in response to the vector data read requests, wherein one type of vector data associated with one vector data stream is loaded from the main memory into one buffer, and wherein each individual buffer reads a group of addresses that belong to the associated vector data stream using a spatial locality of a linear address and a sequential behavior of the associated vector data stream;
the data buffers further configured to transfer, between the data buffers and the execution core, the vector data on a stream-by-stream basis;
the execution core further configured to re-assign one or more of the direct memory access engines to a different vector data stream depending on phases of the scoring operation until a last score has been computed; and
wherein the scoring operation includes one or more of the following scoring operation types: Gaussian Mixture Model (GMM), Affine Neural Network operations, Diagonal Matrix multiplication, Recurrent Neural Networks, and/or Copy Operations,
wherein the scoring operation is utilized in voice recognition operations to output a top-scoring match, and
wherein the vector data types include one or more data types including: a mixture component mean vector, a variance vector, a Gaussian constant vector, a score vector, and/or a feature vector.

19. At least one non-transitory machine readable medium comprising: a plurality of instructions that in response to being executed on a computing device, causes the computing device to perform:
setting up, via an execution core, a scoring operation associated with a plurality of vector data types on a plurality of direct memory access engines on a stream-by-stream basis where a single vector data stream associated with a corresponding single vector data type is set up for processing via a corresponding single direct memory access engine;
consuming, via the execution core, vector data stored in a plurality of data buffers during the scoring operation, wherein the vector data is consumed in a stream-by-stream basis;
transferring, between the data buffers and the direct memory access engines, an indication that a given buffer associated with a given stream is has a certain fullness, wherein the transfer between the data buffers and the direct memory access engines is on a stream-by-stream basis; and
throttling, via the direct memory access engines, data requests so as to stop and/or start such data requests in response to the indication from the data buffers that a given buffer associated with a given stream has a certain fullness, wherein the throttling is on a stream-by-stream basis.

20. The at least one non-transitory machine readable medium method of claim 19, further comprising:
  requesting, between the direct memory access engines and a memory management unit, an address translation on a stream-by-stream basis;
  transferring, between the memory management unit and a bus interface, page info read requests on a stream-by-stream basis, wherein the page info includes a sequence of read operations of relevant parts of a hierarchical page table;
  transferring, between the bus interface and a main memory, the page info read requests, wherein the bus interface arbitrates between pending requests;
  returning, between the main memory and the memory management unit, page info data in response to the page info read request from the memory management unit;
  transferring, between the memory management unit and the direct memory access engines, address translation data ready replies;
  transferring, between the direct memory access engines and the bus interface, vector data read requests on a stream-by-stream basis in response to the direct memory access engines receiving an address translation data ready reply;
  transferring, between the bus interface and the main memory, the vector data read requests, wherein the bus interface arbitrates between pending requests;
  returning, between the main memory and the data buffers, vector data on a stream-by-stream basis in response to the vector data read requests, wherein one type of vector data associated with one vector data stream is loaded from the main memory into one buffer, and wherein each individual buffer reads a group of addresses that belong to the associated vector data stream using a spatial locality of a linear address and a sequential behavior of the associated vector data stream;
  transferring, between the data buffers and the execution core, the vector data on a stream-by-stream basis;
  re-assigning, via the execution core, one or more of the direct memory access engines to a different vector data stream depending on phases of the scoring operation until a last score has been computed; and
  wherein the scoring operation includes one or more of the following scoring operation types: Gaussian Mixture Model (GMM), Affine Neural Network operations, Diagonal Matrix multiplication, Recurrent Neural Networks, and/or Copy Operations,
  wherein the scoring operation is utilized in voice recognition operations to output a top-scoring match, and
  wherein the vector data types include one or more data types including: a mixture component mean vector, a variance vector, a Gaussian constant vector, a score vector, and/or a feature vector.

* * * * *